United States Patent Office 3,445,744
Patented May 20, 1969

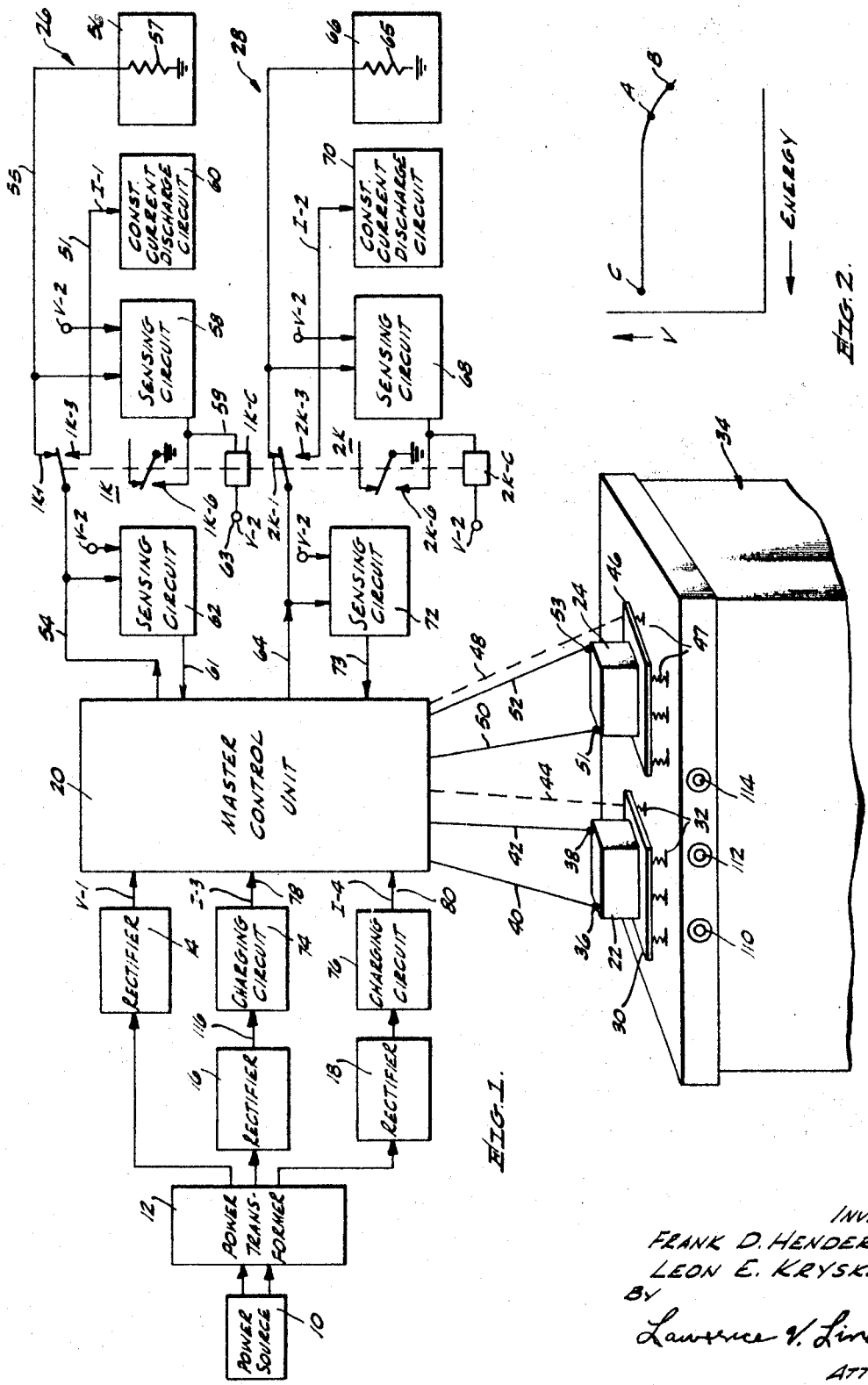

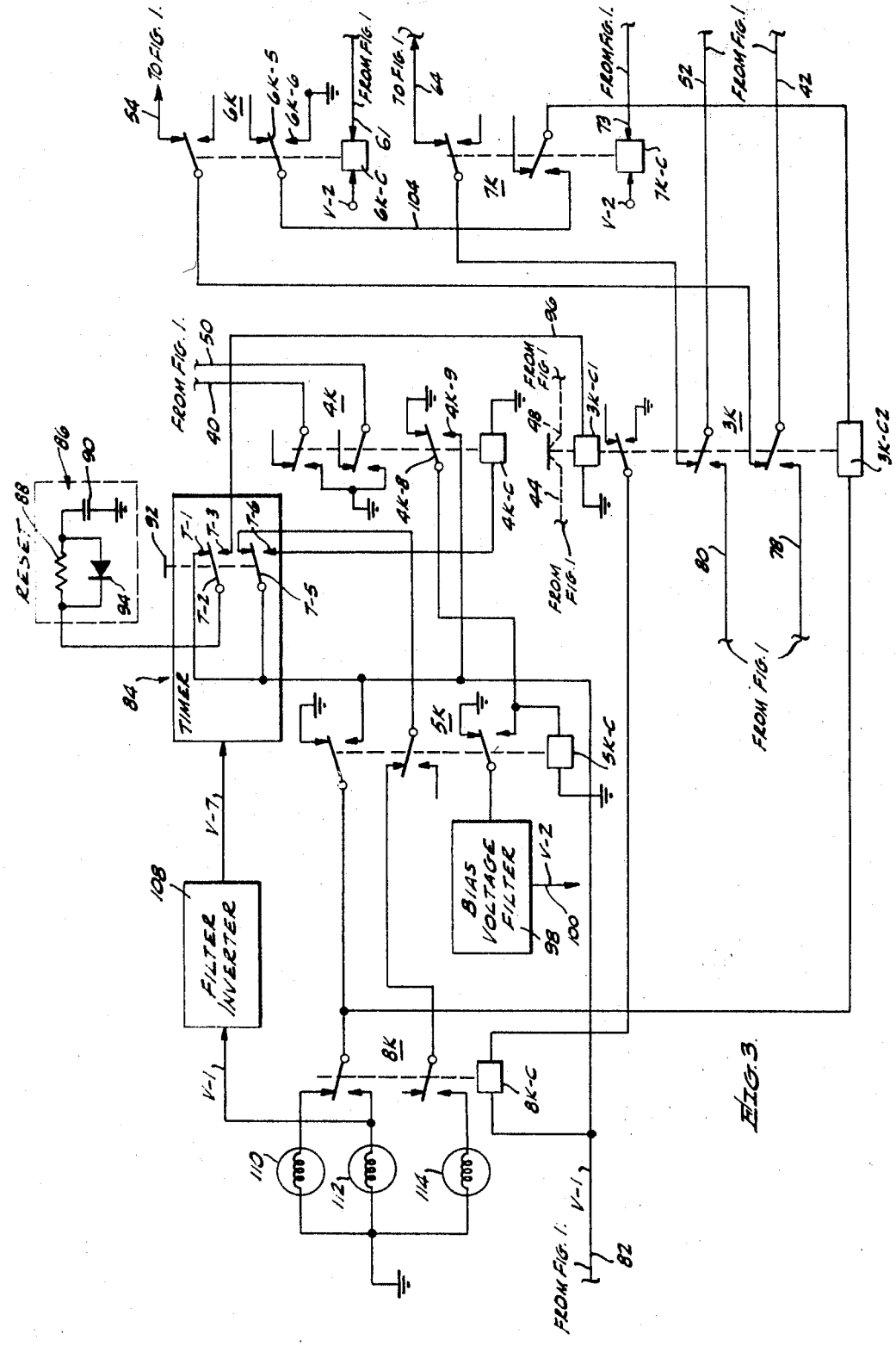

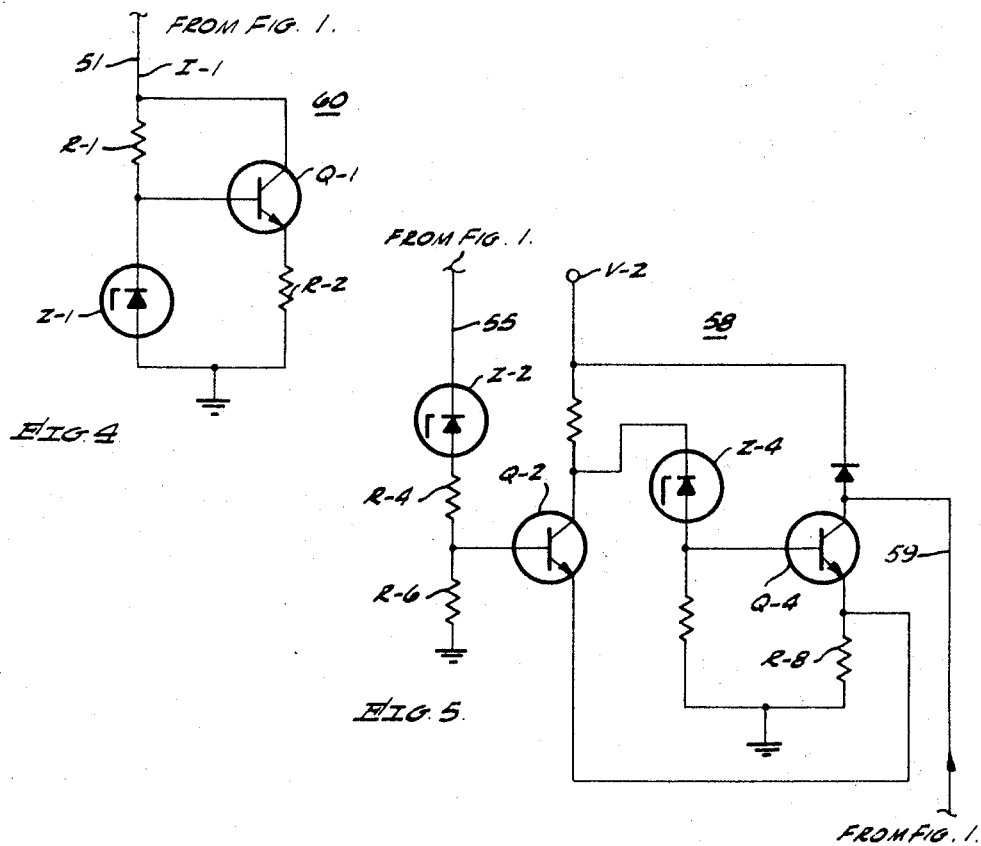
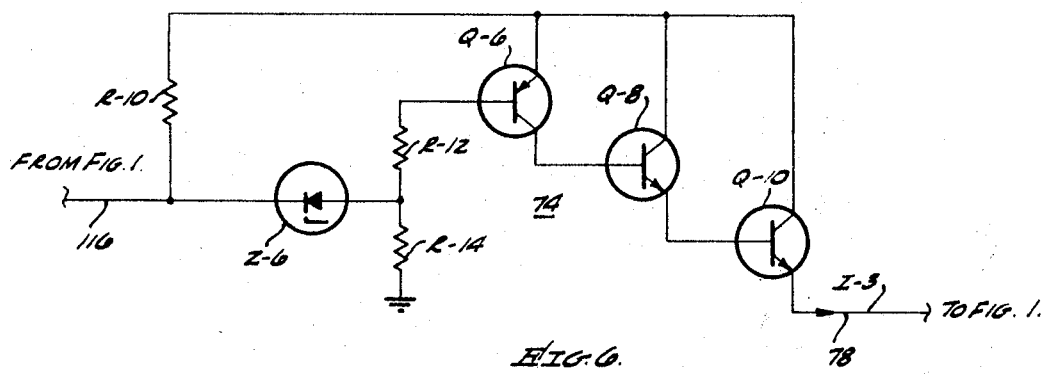

3,445,744
DEVICE FOR AND THE METHOD OF CHARGING BATTERIES
Frank D. Henderson, Placentia, and Leon E. Kryske, Los Angeles, Calif., assignors to Hughes Aircraft Company, Culver City, Calif., a corporation of Delaware
Filed Feb. 23, 1968, Ser. No. 708,479
Int. Cl. H01m 45/04; H02j 7/10
U.S. Cl. 320—6                                    24 Claims

ABSTRACT OF THE DISCLOSURE

A device for simultaneously and independently charging a plurality of batteries, which device includes a plurality of constant current charging circuits, resistive loads, constant current discharging circuits, voltage sensing circuits and a master control unit. The master control unit controls the coupling between the batteries and the charging and discharging circuits so as to first establish a discharging mode of operation and to subsequently establish a charging mode of operation. During the discharging mode of operation, and under control of the voltage sensing circuits, each battery is individually coupled first to a resistive discharge circuit and then to a constant current discharge circuit so that all batteries are discharged to predetermined states. During the charging mode, each of the batteries is coupled to individual constant current charging circuits for a controlled time period so that each battery is charged to a selected standard condition of charge. The master control unit further includes logic circuits for preventing over charging of a battery in the event of power failure or upon the substitution of batteries.

Background of the invention

This invention relates to battery chargers and in particular to a device for and a method of charging sealed batteries so as to obtain a controlled state of charge therein.

Heretofore, battery chargers did not incorporate provisions for ensuring that the battery is charged to a selected state of charge. The use of such prior art battery chargers, especially with batteries that are completely sealed, may result in either over or under charging of the battery. Since under charging decreases the efficient use of the battery and over charging may result in permanent damage thereto, a device for and a method of charging a battery so as to reliably obtain a controlled state of charge therein would be a significant advancement of the art.

Summary of the invention

Briefly the battery charger in accordance with the principles of this invention includes a master control unit for coupling a battery first to a discharge unit and then to a charging circuit. The discharge unit includes a resistive load circuit, a constant current load circuit, sensing circuits and a switching circuit. The battery is first discharged into the resistive load circuit until a first sensing circuit indicates that the voltage across the battery is below a first voltage level at which point the switching circuit couples the battery to the constant current load circuit. After the battery is discharged below a second voltage level a second sensing circuit generates a control signal that is applied to the master control unit. In response to said control signal, the master control unit disconnects the battery from the discharge unit and couples it to the charging circuit for a period of time controlled by a timing device in the master control unit. The master control unit further includes logic circuits for ensuring that the battery is not under charged due to the occurrence of a prime power failure or that a battery is not damaged by overcharging upon the substitution of batteries in the battery charger during a charging cycle.

It is therefore an object of this invention to provide an improved device for and method of charging a battery or a plurality of batteries to a given state of charge.

A further object is to provide a device for and a method of charging a battery to a standard condition of charge and for protecting said battery against cell reversal, while discharging and against over charging.

A still further object is to provide an efficient, convenient and reliable device for charging a plurality of batteries to selected standard conditions of charge and which protects against under charging due to prime power failure and against over charging due to battery substitutions during the charging cycle.

Brief description of the drawings

The novel features of this invention as well as the invention itself will best be understood from the accompanying description taken in conjunction with the accompanying drawings in which like reference characters refer to like parts and in which:

FIG. 1 is a block and schematic diagram and partial perspective view of a preferred embodiment of a battery charger device in accordance with the principles of the subject invention;

FIG. 2 is a voltage vs. stored energy diagram for explaining the operation of the battery charger of FIG. 1;

FIG. 3 is a schematic and block diagram of a master control unit that may be utilized in the charger of FIG. 1;

FIG. 4 is a constant current discharge circuit that may be utilized in the charger of FIG. 1;

FIG. 5 is a voltage sensing circuit that may be utilized in the charger of FIG. 1; and FIG. 6 is a constant current charging circuit that may be utilized in the charger of FIG. 1.

Description of the preferred embodiment

The operation of the battery charger of FIG. 1 in accordance with the principles of the subject invention may be better understood by also referring to FIG. 2 which shows the voltage across a battery as a function of the charge level of the battery. As shown by the curve in FIG. 2, the voltage across the battery, which, for example may be a nickel cadmium battery, is substantially constant over a wide range of charge conditions, such as between points A and C. Due to this constant voltage battery characteristic, and particularly in the case of sealed batteries the state of charge of the battery cannot be determined and heretofore battery chargers have not been capable of charging a battery to a maximum safe state of charge (point C, FIG. 2). As noted previously, if a battery is under charged its effectiveness is decreased and in sealed batteries, if over charging occurs, unilateral ventilation and permanent damage may be produced. The charger of FIG. 1 is capable of charging plurality of batteries to the maximum safe states for each battery while protecting against damage caused by over charging, or by cell reversal during discharge modes.

In accordance with the principles of the subject invention each battery is first dischared into separate resistive loads which are designed to quickly remove most of the stored charge of the batteries. This step is terminated individually for each battery when the voltage of each battery falls to a predetermined value as measured by a voltage sensing circuit. The batteries are next deep discharged in response to a constant current circuit and this step is terminated under the control of a sensing circuit when a second predetermined voltage level has been reached. When each of the plurality of batteries have been dischared, the charging step commences. During said charging step each battery is individually charged to a desired state of charge in response to constant current circuits which are individually coupled to each battery for a controlled time period. Although in the interest of clarity, the charger of FIG. 1 is shown for the case of only two batteries having different terminal voltages, it will be readily apparent to those skilled in the art that in accordance with the principles of the subject invention the charger may be expanded to accommodate any number of batteries, or functionally independent battery sections, having any combination of terminal voltages.

Referring now primarily to FIG. 1, a source of alternating current power 10 is coupled through a power transformer 12 to input circuits of conventional rectifiers 14, 16 and 18. The rectifier 14 applies an unregulated direct current voltage V–1 to a master control unit 20. A battery 22 which may be a 24-volt sealed nickel cadmium battery, for example, is supported on a base 30 that is mounted to a console 34 by a plurality of springs 32. Terminals 36 and 38 of the battery 22 are coupled to the master control unit 20 by leads 40 and 42, respectively. The base 30 is mechanically coupled to the master control unit 20 by a mechanical or suitable linkage 44 so that when the battery 22 is removed from the charger the base 30 moves upward in response to the springs 32 thereby activating the linkage 44. In a similar manner, the battery 24, which may be a 50-volt sealed nickel cadmium battery, for example, is supported on a base 46, which base is mounted by springs 47 to the console 34. The base 46 is mechanically coupled to the master control unit 20 by means of a mechanical or suitable linkage 48 in a manner similar to that described for the base 30. It is noted that any mechanical interlock arrangement, such as a spring loaded member disposed between the battery and the base, may be utilized in accordance with the invention in lieu of the spring mounted base arrangement herein before described. Terminals 51 and 53 of the battery 24 are coupled by leads 50 and 52, respectively, to the master control unit 20.

In response to the voltage V–1, the master control unit 20 applies a ground potential to the lead 40 and couples the lead 42 to an input lead 54 of a discharge unit 26. The master control unit 20 also applies a bias voltage V–2 to the discharge unit 26 and to a discharge unit 28. The lead 54 is coupled through a contact 1K–1, of a normally opened (position shown) relay 1K, to a resistive load 56. As a result, the battery 22 is quickly discharged through a resistor 57 to a voltage level V–3. A voltage sensing circuit 58, also coupled to resistive load 56, senses when the voltage applied thereto reaches the level V–3, at which time the sensing circuit 58 applies a ground potential signal to a terminal 59 of a coil IK–C. As will be explained subsequently, the voltage V–2 is applied to the other terminal, 63, of the coil 1K–C from the master control unit 20. In response to the ground signal applied to the terminal 59 by the sensing circuit 58 the relay 1K is closed and is held closed by a ground potential applied to the terminal 59 through a contact 1K–6. The input lead 54 is coupled through a contact 1K–3 of the closed relay 1K to a constant current discharging circuit 60, which circuit deep discharges the battery 22 at a constant current I–1. When the battery 22 has been discharged to a predetermined voltage level V–4, a voltage sensing circuit 62, which is coupled to the lead 54, generates a control signal which is applied to a lead 61. In response to this control signal the master control unit 20 uncouples or disconnects the battery 22 from the discharge circuit 26.

In a similar manner to that just described for the battery 22, the battery 24 is simultaneously discharged by the discharge circuit 28. The master control unit 20 applies a ground potential to the lead 50 and couples the lead 52 to an input lead 64 of the discharge unit 28. The lead 64 is coupled through a contact 2K–1 of a relay 2K, to a resistor 65 of a resistive load 66. A voltage sensing circuit 68, which is coupled to the resistor 65, activates a coil 2K–C when the voltage across the battery 24 decreases to a voltage level V–5. The relay K2 is closed in response to the sensing circuit 68 and is held closed by a ground potential that is applied through a contact 2K–6 to the coil 2K–C. The input lead 64 is coupled through the closed relay 2K to a constant current discharge circuit 70 which circuit deep discharges the battery 24 at a constant current I–2 until a voltage level V–6 is reached. A voltage sensing circuit 72, which is coupled to the input lead 64, provides a control signal to a lead 73 when the voltage applied to the lead 64 decreases below the value V–6. In response to this control signal, applied to the lead 73, the master control unit 20 uncouples or disconnects the battery 24 from the discharge unit 28.

The rectifier 16 provides a direct current voltage to a charging circuit 74 which in turn applies a constant output current I–3 to the master control unit 20. Also, the rectifier 18 provides a direct current voltage to a charging circuit 76 which in turn provides a constant output current I–4 to the master control unit.

When both batteries 22 and 24 have been discharged as indicated by the control signals applied to the leads 61 and 73, respectively, the master control unit couples the charging circuits 74 and 76 to the battery leads 42 and 52, respectively. The charging circuits 74 and 76 remain coupled to the leads 42 and 52, respectively, for a controlled period of time so that the batteries are both fully charged (point C, FIG. 2). The value of the currents I–3 and I–4 are selected to be compatible with the charging period of the master control unit so that during the controlled time period each of the batteries store a desired amount of charge.

The master control unit 20 is shown in greater detail in FIG. 3. The voltage V–1, which may be 27 volts direct current, unregulated voltage for example, is applied from the rectifier 14 (FIG. 1) to an input lead 82 which is coupled to a contact T1 and to a switch member T5 of a conventional timing device or timer relay 84. It should be noted that all of the relays of FIG. 3 are shown in their normally open or inactivated position. The voltage V–1 is applied through the contact T1 to a reset circuit 86 which may include a resistor 88 coupled in series to a capacitor 90. When the timer relay is open, the capacitor 90 is charged through the resistor 88 to the potential V–1. When a set button 92 is depressed, the relays of the timer are switched to the closed position and the capacitor 90 is discharged through a diode 94, a contact T–3, a lead 96, and a coil 3K–C1 to ground. In response to the current through the coil 3K–C a relay 3K is set to the open position (the position shown in FIG. 3). Also when the reset button 92 is depressed, the voltage V–1 is applied through a contact T–6 to activate a relay coil 4K–C thereby closing a relay 4K. The closure of the relay 4K couples the negative leads 40 and 50 of the batteries 22 and 24 (FIG. 1), respectively, to ground. Further when the relay K–4 is closed, the voltage V–1 is applied through a contact 4K–9 and a switch member 4K–8 to a coil 5K–C. In response to the voltage V–1 applied to the coil 5K–C a relay 5K is closed, thereby further applying the voltage V–1 to a biased voltage filter 98. The voltage V–1 is filtered by the biased voltage filter 98, which filter applies the voltage V–2, which may be a 27 volt filtered direct current voltage, to an output terminal 100.

The positive terminal lead 42 of the battery 22 is coupled through relays 3K and 6K to the input terminal lead 54 of the discharge unit 26 (FIG. 1) and then through the relay 1K to the lead 55 and the resistive load 56. The majority of the charge of the battery 22 is quickly discharged through the resistive load 56 and this first phase of the discharge operation is terminated when voltage across the battery 22 decreases to the voltage level V–3 as was explained previously. For example, for the case of the battery 22 being a 24-volt nickel cadmium battery, the voltage level V–3 (point A of FIG. 2) may be selected at 19.5 volts. The sensing circuit 58 senses when the voltage across the battery 22 drops to the voltage level V–3 at which point ground potential is applied to the relay coil 1K–C so as to switch the lead 54 to the contact 1K–3 and thereby to the constant current discharge circuit as was explained previously.

After the relay 1K is activated, the battery 22 is discharged into the constant current discharge circuit 60 until a voltage level of V–4 is sensed on the lead 54 by the sensing circuit 62 as previously discussed. When the voltage across the battery 22 drops below the value V–4, the sensing circuit 62 applies a ground potential to a lead 61 that is coupled to one end of the coil 6K–C (FIG. 3) and in response thereto the relay 6K is closed disconnecting the lead 42 from the discharge circuit 26. Further, when the relay 6K is closed, or energized, a lead 104 is coupled to ground through a switch member 6K–5 and a contact 6K–6.

In a similar manner the positive terminal lead 52 of the battery 24, which may be a 50-volt nickel cadmium battery, for example, is coupled through the relays 3K and 7K to the input lead 64 of the discharge unit 28 (FIG. 1). The discharge cycle of the battery 24 is similar to that explained for the battery 22 except that the battery is switched to the constant current source 70 at a voltage level V–5 which level may be 48.5 volts for example. Also, the sensing circuit 72 is activated at a voltage level V–6 which may be 33 volts for example. Therefore when the voltage applied to the lead 64 (the voltage across the battery 24) drops to 33 volts, the sensing circuit 72 supplies a ground potential to a lead 73 which is coupled to a coil 7K–C. The coil 7K–C is activated by the ground potential so as to close the relay 7K. When the relay 7K is switched closed, the lead 52 is disconnected from a discharge unit 28 and the lead 104 is coupled through the relay 7K to one end of a coil 3K–C2. The other end of the coil 3K–C2 had been previously activated by the voltage V–1 that was applied through the relay 5K, closure of which relay, 5K, had previously been described. The closure of the relay 3K in response to the signal applied on the lead 104 connects the leads 42 and 52 to the charge circuit output leads 78 and 80, respectively.

The value of the resistor 57 (FIG. 1) of the resistive load circuit 56 is selected so as to quickly remove most of the stored charge from the battery 22, and the resistor 57 may be 10 ohms, for example. The constant current source 60 provides deep discharge of the battery 22 at a substantially constant current I–1 which may be 0.36 ampere for example.

Referring now to FIG. 4 which shows one suitable constant current discharge circuit, the voltage applied to the lead 51 (FIG. 1) is applied to a first end of a resistor R–1 and to a collector terminal of a n-p-n transistor Q–1. The other end of resistor R–1 is coupled to a Zener Diode Z–1 and to the base terminal of the transistor Q–1. An emitter terminal of the transmitter Q–1 is coupled through a resistor R–2 to ground. In operation of the constant current discharge circuit substantially all the current I–1 flows through the collector-emitter region of the transistor Q–1 and the base potential of the transistor Q–1 is clamped to a fixed value by the Zener diode Z–1. Therefore the current I–1 is controlled in response to the base to emitter potential of the transistor Q–1, which potential is a function of the current that flows through the resistor R–2. The transistor Q–1, in response to the base emitter potential, varies its dynamic collector to emitter resistance so as to regulate the value of the current I–1 to an essentially constant value.

A voltage sensing circuit of a type suitable for the circuits 58, 62, 68 and 72 (FIG. 1) is shown in FIG. 5. Although the circuit of FIG. 5 will be explained relative to the voltage sensing circuit 58, it will be obvious to those skilled in the art that the circuit may be modified and utilized for the voltage sensing circuits 62, 68 and 72. The voltage applied to the lead 55 (FIG. 1) is applied through a Zener diode Z–2 and series connected resistors R–4 and R–6 to ground.

The junction point between the resistors R–4 and R–6 is coupled to a base terminal of a transistor Q–2, and a collector terminal of the transistor Q–2 is coupled through a Zener diode Z–4 to a base terminal of a n-p-n transistor Q–4. The output lead 59 (FIG. 1) is connected to a collector terminal of the transistor Q–4. In the operation of the voltage sensing circuit of FIG. 5, when the potential applied to the lead 55 drops below the potential V–3, which may be 19.5 volts for example, the Zener diode Z–2 ceases conduction therefore causing the base voltage of the transistor Q–2 to fall which results in the base voltage of the transistor Q–4 rising in level. In response to this rise or increase in its base voltage, the transistor Q–4 switches on (conducts heavily) so as to couple the lead 59 through the resistor R–8 to ground.

By way of an illustrative example of one operative arrangement in accordance with the principles of the invention, the values which may be associated with the discharge unit 26 for the case of the battery 22 being a 24-volt nickel cadmium battery are:

R–57 may be 10 ohms;

The constant current discharge circuit 60 provides a substantially constant current load of approximately 0.36 amperes (I–1);

The sensing circuit 58 switches when the input voltage applied thereto decreases below approximately 19.5 volts (V–3);

The sensing circuit 62 switches when the input voltage applied thereto decreases below approximately 16.5 volts (V–4).

Also by way of an illustrative example of one operative arrangement in accordance with the principles of the invention, the values associated with the discharge unit 28 for the case of the battery 24 being a 50-volt nickel cadmium battery are:

R–65 may be 80 ohms;

The constant current discharge circuit 70 provides a substantially constant current load of approximately 0.11 amperes (I–2);

The sensing circuit 68 switches on when the input voltage applied thereto decreases to approximately 48.5 volts (V–5);

The sensing circuit 72 switches on when the input voltage applied thereto decreases to approximately 33.0 volts (V–6).

Referring again primarily to FIG. 3, the structure of the master control unit 20 relative to the charging mode of operation will be further described. As was previously explained, when both batteries 22 and 24 have been discharged to the proper value (point B of FIG. 2) the relay 3K is closed in response to the ground potential applied to the coil 3K-C2 through the relays 6K and 7K. Upon the closure of relay 3K, a ground signal is applied to a coil 8K–C resulting in the closure of the relay 8K. Since the relay 5K has been previously closed, upon the closure of the relay 8K, the voltage V–1 is applied through the relays 5K and 8K to a conventional filter inverter circuit 108. In response to the voltage V–1 the filter inverter circuit 108 generates a voltage V–7 which may be, for example, 24 volts peak to peak at a frequency of 50 hertz. The timing device 84 is activated by the voltage V–7 and after a predetermined time period, which may be four hours for example, the contacts of the timing device 84 are opened.

In response to the opening of the contacts of the timing device, all the relays of the charger of the subject invention are returned to the open position except the relays 3K and 8K. The relay 3K, not being spring loaded to the open position, remains in its last position until switched by either of the coils 3K–C1 or 3K–C2, or the mechanical linkages 44 and 48. The relay 8K remains closed until the ground is removed from the coil 8K–C by the opening of the relay 3K. The relay 3K, as was explained previously, is opened (rest) in response to a reset pulse applied through the contact T-3 when operation of the charger is commenced upon the start of a new cycle (depressing reset button 92). Also the relay 3K may be mechanically reset (opened) in response to the actuation of the linkage 44 or 48 (FIG. 1) as a result of the removal of either battery 22 or 24. The purpose of the linkages 44 and 48 (mechanical interlocks) is to ensure that the charging mode is interrupted in the event that a battery is removed from the charger. This just described feature guarantees that a substituted battery would not be installed into the charger without first returning the charger to the discharge mode of operation; i.e., so that a battery may not be placed in the charging mode without having first been through the discharge mode of operation.

During the time period that the batteries 22 and 24 are being discharged in response to the discharge units 26 and 28, respectively, the voltage V–1 is applied through the closed relay 5K and through the open relay 8K to a discharge light 110. During the charging mode of operation, the voltage V–1 is applied through the closed relays 5K and 8K to a charging light 112. After completion of the charging operation, the voltage V–1 is applied through the opened relay 5K and through the closed relay 8K to a fully charged light 114. The fully charged light remains illuminated until the relay 8K is opened in response to the opening of the relay 3K. As mentioned previously, the relay 3K may be opened (reset) either by the removal of a battery or on the start of another cycle of operation by the depression of the reset button 92.

A constant current charge circuit, suitable for the circuits 74 and 76, is shown in FIG. 6 and will be explained relative to the circuit 74. The output voltage from the rectifier 16 (FIG. 1) which may be 60 volts direct current, for example, is applied to an input lead 116 of the circuit of FIG. 6. One end of a resistor R–10 is coupled to the lead 116 and the other terminal of the resistor R–10 is coupled to an emitter terminal of a transistor Q–6 and to collector terminals of transistors Q–8, and Q–10. A Zener diode Z–6 has a cathode terminal coupled to the lead 116 and an anode terminal coupled between resistors R–12 and R–14. In the operation of the circuit of FIG. 6 the emitter current supplied to the transistor Q–6 and the collector currents supplied to the transistors Q–8, and Q–10 flow through the resistor R–10 thereby varying the base to emitter bias of the transistor Q–6. Therefore, as the current I–3 varies in response to the load (the battery 22) the transistor Q–6 changes the driving voltage applied to the base terminal of the transistor Q–8 so as to maintain the current J–3 at approximately a constant value.

In the operation of the charger in accordance with the principles of the subject invention, batteries 22 and 24 are installed in the console 34 prior to applying prime power from the power source 10. Upon the application of prime power the charger remains essentially idle until the reset button 92 is depressed resulting in the batteries 22 and 24 being connected across the discharge circuits 26 and 28, respectively. Although the discharge mode of operation will be explained with primary reference to the battery 22, it is understood that the battery 24 is discharged by the unit 28 in a similar manner. The major portion of the charge stored in the battery 22 is first discharged into the resistive load unit 56 until the voltage level V–3 is sensed by the sensing circuit 58. When the voltage across the battery 22 drops below the value V–3, the sensing circuit 58 actuates the relay coil 1K–C which closes the relay 1K thereby switching the battery to the constant current discharge circuit 60. The battery is discharged at a constant current rate into the circuit 60 until the voltage level V–4 is sensed by the sensing circuit 62 at which time the relay 6K (FIG. 3) is closed disconnecting the battery from the discharge circuit 26. In a similar manner the battery 24 is discharged first into the resistive load 66 and then into the constant current discharge circuit 70. Upon the completion of the discharge cycle of the battery 24 the relay 7K is closed thereby actuating the relay coil 3K–C2 which switches both batteries from their discharge units to their respective constant current charging unit. Closure of the relay 3K further activates the relay 8K which applies the voltage V–1 to the filter inverter 108 which in turn starts the timing device 84. After a designated charging time period, the timing device 84 automatically resets the timing device contacts thereby terminating the charging cycle.

Since over charging can be harmful to batteries, the charger in accordance with the subject invention has been designed so that the removal of a battery or the pushing of the timer button will reset (open) the relay 3K, thereby placing the charger in the discharge mode. Battery removal actuates the interlocks 44 and 48 which mechanically reset the relay 3K. Also, depression of the reset button 92 causes an electrical setting of the relay 3K. Further, if the power source 10 should fail, upon return of power the charger will return to the mode of operation that it was in at the time of power failure. If the charger is in the discharge mode at the time of power failure, the relay 3K is open and the voltage sensing circuits 58, 62, 68 and 72 control the operation thereof. Upon the restoration of power, the voltage sensors will again determine the mode of discharge. If the charger is in the charging mode when the power failure occurs, the relay 3K which is closed will remain in that condition and the timing device 84 ceases to operate during the power failure. Upon the re-application of power, during this condition, the timing device 84 will again commence operating and the charger will complete the charging cycle.

Thus there has been described a battery charger which is capable of simultaneously charging a plurality of batteries which may be sealed or open types, to selected states of charge while protecting against cell reversal and overcharging. Although in the interest of simplicity, the described embodiment explains in detail the operation of a two-battery charger, it will be apparent to those skilled in the art that in accordance with the principles of the subject invention that a battery charger may be constructed which is adaptable to a single battery, having one or a plurality of functionally independent sections, or to any number of such batteries. Also in the preferred embodiment described herein, the charging mode of operation is controlled by a single timing device and interconnected switching relays so as to delay the start of the charging mode until all batteries have completed the discharge mode of operation. However, it will be obvious to those skilled in the art, that a plurality of timing devices may be incorporated so that each one of the plurality of batteries or sections (in multi-section batteries) may be discharged and charged independently.

Further the discharge and charging units as herein and before described have been explained in terms of fixed parameter values. However it will be readily apparent to those skilled in the art that the circuits are easily adaptable to selectable parameter values. For example, the discharge and charging units associated with a particular battery position may comprise interconnected (ganged) switches such that the discharge and charging rates may be selected to be compatible with the requirements of any battery.

What is claimed is:
1. A battery charger comprising:
a discharge unit including first and second discharge circuits, swtiching means for coupling a battery to said first discharge circuit when the voltage across the battery is above a first voltage range and for coupling the battery to said second discharge circuit when the voltage across the battery is within the first voltage range, and first sensing means coupled to said switching means for generating a first control signal when the voltage across the battery is below the first voltage range;
a charging unit; and
control means for coupling the battery to said discharge unit until the battery is discharged to a first state of charge below the first voltage range, said control means being responsive to the first control signal for uncoupling the battery from said discharge unit and coupling the battery to said charging unit for a time period required to obtain a final condition of charge therein.

2. The battery charger of claim 1 wherein said first discharge circuit comprises a resistive circuit and said second discharge circuit includes a constant current discharge circuit.

3. The battery charger of claim 2 wherein said charging unit includes a constant current charging circuit.

4. The battery charger of claim 3 wherein said control means includes a timing device for uncoupling said constant current charging circuit from the battery after the battery reaches the final condition of charge.

5. The battery charger of claim 4 further comprising: means coupled to said charging unit for receiving power; and
power failure interlock means coupled to said timing device for inactivating said timing device during the period of a power failure.

6. The battery charger of claim 5 further comprising:
a base adapted for supporting the battery;
leads coupling said battery to said charger; and
removal interlock means, coupled between said base and said control means, for uncoupling said leads from said charging unit and for coupling said leads to said discharge unit upon the removal of the battery from said base.

7. A battery charger comprising:
a discharge unit having an input circuit, a first discharge circuit, and a second discharge circuit;
said discharge unit further including switching means for coupling said input circuit to one of said first and second discharge circuits as a function of the voltage applied to said input circuit;
a charging unit; and
control means for coupling said battery to said input circuit until the battery is discharged to a first state of charge and then for coupling the battery to said charging unit until a second state of charge is obtained.

8. The battery charger of claim 7 wherein said first discharge circuit comprises a resistive circuit and said second discharge circuit includes a constant current discharge circuit.

9. The battery charger of claim 8 wherein said charging unit includes a constant charging circuit.

10. The battery charger of claim 7 wherein:
said switching means couples said input circuit to said first discharge circuit when the voltage applied to said input circuit is above a first voltage range, and couples said input circuit to said second discharge circuit when the voltage applied to said input circuit is within the first voltage range;
said discharge unit further including sensing means for generating a control signal when the voltage applied to said input circuit is below the first voltage range; and
wherein said control means responds to the control signal for uncoupling the battery from said input circuit and coupling the battery to said charging unit.

11. A device for charging a plurality of batteries comprising:
a plurality of discharge units;
a plurality of charging units;
master control means for coupling each one of a plurality of batteries to a selected one of said plurality of discharge units until the batteries are discharged to individually selected first states of charge and for then coupling each one of the plurality of batteries to a selected one of said plurality of charging units;
each one of said plurality of discharge units including an input circuit coupled to said master control means, first and second discharge circuits, and switching means for coupling said input circuit to one of said first and second discharge circuits as a function of the voltage applied to said input circuit.

12. The device of claim 11 wherein:
each one of said plurality of switching means couples a corresponding input circuit to one of said plurality of first discharge circuits when the voltage applied to the input circuit is above a selected range of a plurality of voltage ranges, and each one of said plurality of switching means couples the corresponding input circuit to one of said plurality of second discharge circuits when the voltage applied to the input circuit is within the selected range of said plurality of voltage ranges;
each one of said plurality of discharge units further including sensing means for generating a control signal when the voltage applied to the corresponding input circuit is below the selected range of said plurality of voltage ranges; and
wherein said master control means responds to said control signals for individually uncoupling each of the batteries from its corresponding input circuit and for simultaneously coupling each one of said plurality of batteries to the selected one of said plurality of charging units.

13. The device of claim 12 wherein:
each of said plurality of first discharge circuits includes a resistive circuit;
each of said plurality of second discharge circuits includes a constant current discharge circuit;
each of said plurality of charging units includes constant current charging circuit; and
said master control means individually couples each of said plurality of batteries to the selected one of said plurality of charging units for a predetermined period of time so that each of said plurality of batteries is charged to individually selected second states of charge.

14. An apparatus for charging at least first and second batteries to first and second states of charge, respectively, comprising:
at least first and second discharge units;
at least first and second charging units;
a master control unit coupled to said discharge units, charging units, and to the batteries; said master control unit having a first switching device for first coupling said first and second batteries to said first and second discharge units, respectively;
said first discharge unit having a first voltage sensing means for generating a first control signal when said first battery is discharged to a first state of charge;
said second discharge unit having a second voltage sensing means for generating a second control signal when said second battery is discharged to a second state of charge; and
said master control unit having a second switching device for uncoupling said first battery from said first discharge unit in response to said first command signal, having a third switching device for uncoupling said second battery from said second discharge unit in response to said second command signal, and said first switching device being responsive to said first and to said second control signals for coupling said first and second batteries to said first and second charging units, respectively.

15. The apparatus of claim 14 wherein said first discharge unit includes:
first and second discharge circuits;
a third voltage sensing means for generating a third control signal when the voltage across the first battery is below a first voltage level; and
a fourth switching device, responsive to said third control signal for coupling the first battery to said first discharge circuit in the absence of said third control signal and for coupling the first battery to said second discharge circuit in response to said third control signal.

16. The apparatus of claim 15 wherein said second discharge unit includes:
   third and fourth discharge circuits;
   a fourth voltage sensing means for generating a fourth control signal when the voltage across the second battery is below a second voltage level; and
   a fifth switching device responsive to said fourth control signal for coupling said second battery to said third discharge circuit in the absence of said fourth control signal and for coupling the second battery to said fourth discharge circuit in response to said fourth control signal.

17. The apparatus of claim 16 wherein said first and third discharge circuits include resistive circuits and said second and fourth discharge circuits comprise constant current discharge circuits.

18. The apparatus of claim 15 wherein said master control unit includes a timing device and said first switching device being controlled by said timing device so that said first and second charging units are coupled to the first and second batteries, respectively, for a predetermined period of time and wherein said first and second charging units each include a constant current charging circuit.

19. The apparatus of claim 18 further comprising:
   a means coupled to said charging unit for receiving power; and
   power failure interlock means coupled to said timing device for inactivating said timing device during the period of a power failure.

20. The apparatus of claim 19 further comprising:
   first and second bases adapted for supporting the first and second batteries, respectively;
   first and second pairs of leads for coupling said first and second batteries, respectively, to said master control unit;
   removal interlock means, coupled between said bases and said first switching device, for uncoupling said first and second pairs of leads from said charging units and for coupling said first and second pairs of leads to said first and second discharge units, respectively, upon removal of a battery from said bases.

21. A method of charging a battery comprising the steps of:
   discharging the battery into a resistive load until the voltage across the battery reaches a first voltage level;
   discharging the battery into a constant current load until the voltage across the battery reaches a second voltage level; and
   charging the battery to a predetermined state of charge.

22. The method of claim 21 wherein said charging step is commenced after the battery reaches said second voltage level and said charging step including charging the battery for a predetermined time period at a selected rate of charge.

23. The battery charger of claim 6 wherein said control means further includes a first switching device for first coupling the battery to said discharge unit, and a second switching device for uncoupling the battery from said discharge unit in response to the first control signal, said first switching device being responsive to the first control signal for coupling the battery to said charging unit.

24. The battery charger of claim 23 wherein said discharge unit further includes a second voltage sensing means for generating a second control signal when the voltage across the battery is discharged to a second state of charge; and said switching means being responsive to the absence of the second control signal for coupling the battery to said first discharge circuit and being responsive to the presence of the second control signal for coupling the battery to said second discharge circuit.

References Cited

UNITED STATES PATENTS

| 2,366,466 | 1/1945 | Amsden | 320—11 X |
| 2,541,935 | 2/1951 | Potter | 320—11 |

RODNEY D. BENNETT, Jr. *Primary Examiner.*

C. L. WHITHAM, *Assistant Examiner.*

U.S. Cl. X.R.

320—31; 320—40